Nov. 12, 1957
W. V. THELANDER
2,812,842
FRICTION CLUTCH PLATE
Filed May 28, 1953
2 Sheets-Sheet 2
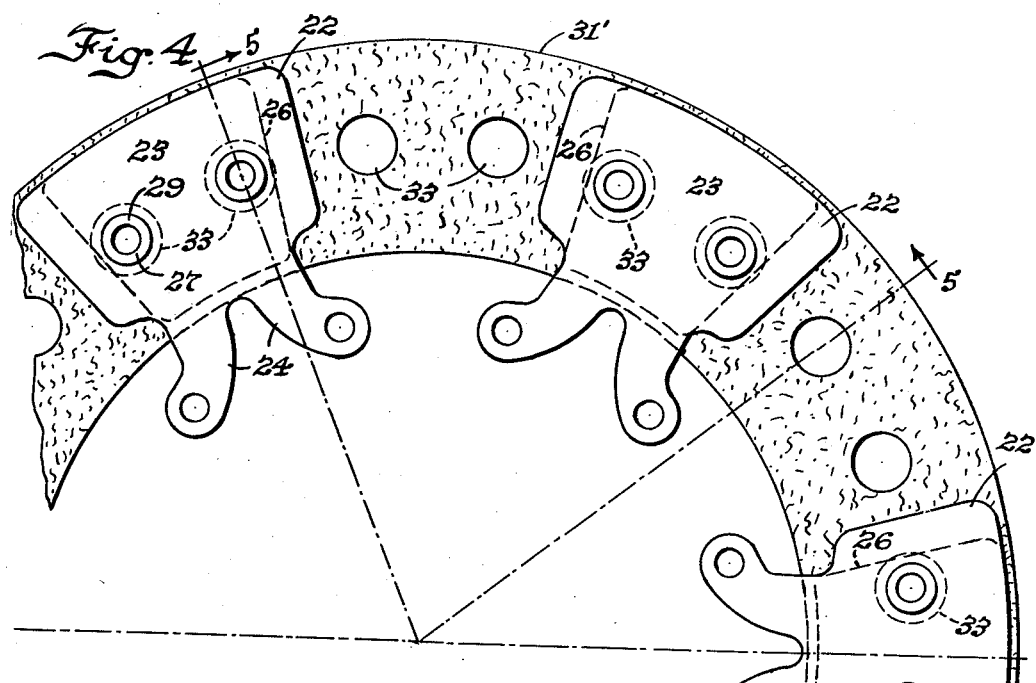
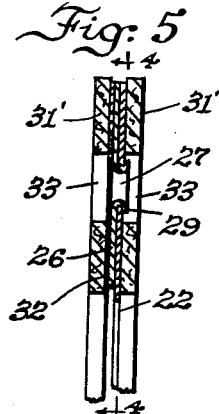
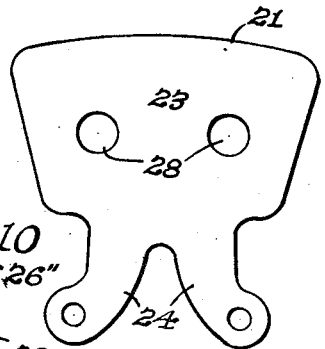
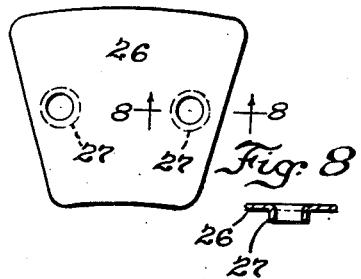
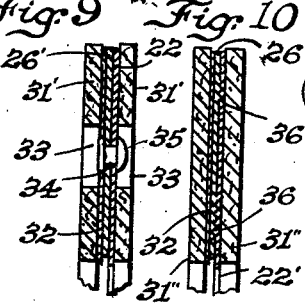
Inventor
W. Vincent Thelander

United States Patent Office 2,812,842
Patented Nov. 12, 1957

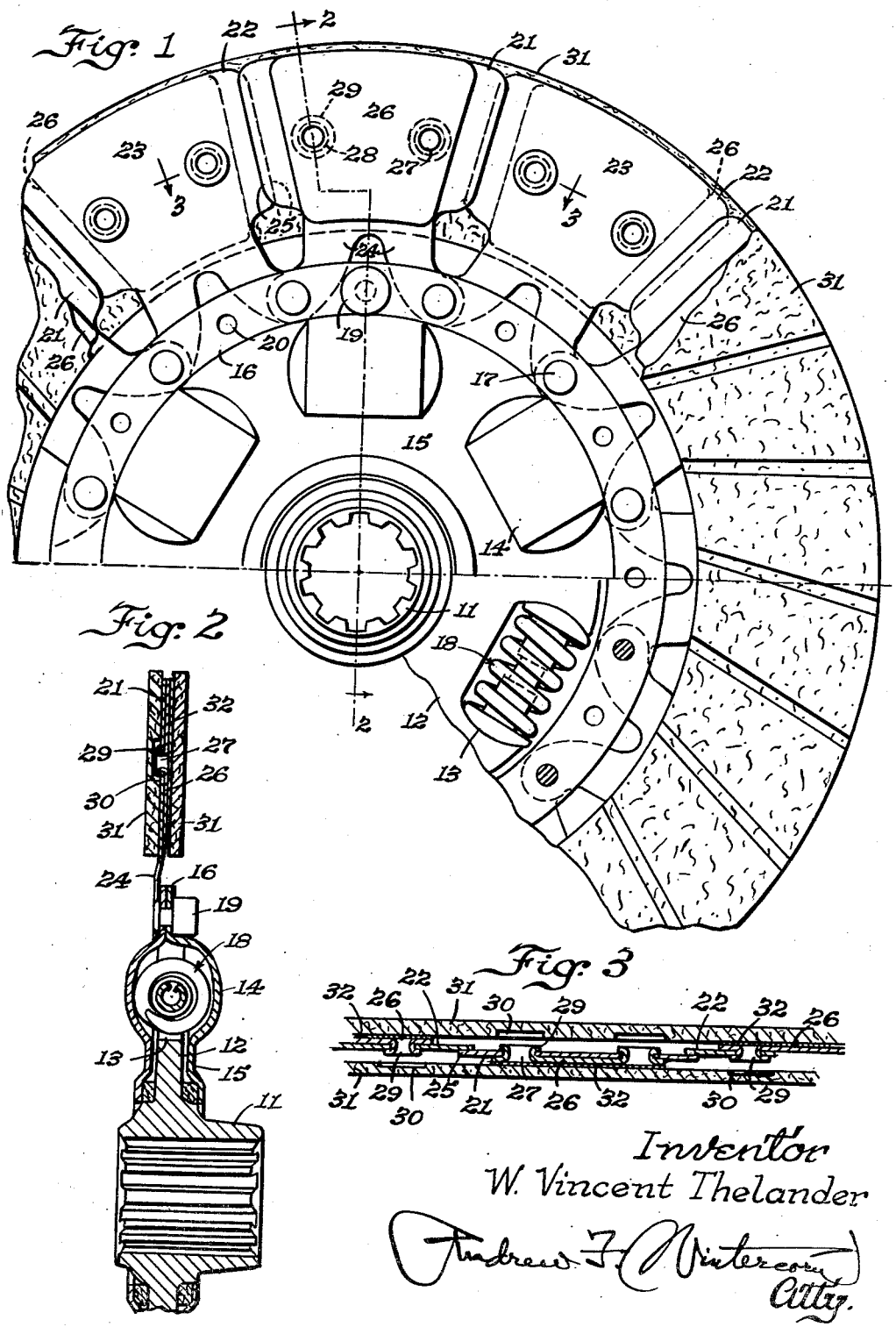

2,812,842
FRICTION CLUTCH PLATE

W. Vincent Thelander, Toledo, Ohio, assignor to Dana Corporation, Toledo, Ohio, a corporation of Ohio Application May 28, 1953, Serial No. 358,151

13 Claims. (Cl. 192—107)

This invention relates to improvements in friction clutch plates, and is more particularly concerned with the so-called "mush" construction used in cushion type clutch plates, that is, the peripheral cushion portion of the plates on which the friction facing material is carried with freedom for the opposed facings to yield under a predetermined pressure so as to give smoother clutch engagement and freedom from grabbing and chattering.

In my Patent 2,524,146 I disclosed a cushion type clutch plate having two parallel series of flexible resilient plate sections or segments concentrically arranged relative to and mounted on the hub member to turn with it, the segments of both series being circumferentially spaced, and the segments of one series being arranged in staggered relation to the segments of the other series, so that the segments of the two series can be flexed toward one another in the compacting of the plate in the engagement of the clutch, the adjoining lateral edge portions of the segments disposed in overlapping relation being flexed to resist compacting with a substantially uniform build-up rate, insuring smoothness of power take-up and comparative freedom from slippage. Spacers are provided mounted on the outer side of both series of segments leaving more than the overlapping edge portions of said segments uncovered and free to be flexed for the cushioning action, the rings of friction facing material being mounted on the outer sides of the two series of segments and spaced therefrom by these spacers.

It is the principal object of my present invention to provide improved friction clutch plates of that same general design, the present improvements being as follows:

(1) Riveting the rings of friction facing material to the cushion segments and spacers necessitated providing depressions in the engaging face of each ring to countersink the rivet heads, and also necessitated providing holes in the rings for rivet head clearance, as clearly shown in Figs. 3 and 5 of the patent aforesaid. It is, therefore, an important feature of my present invention to bond the rings of friction facing material to the spacers and fasten the spacers to the segments either by spot-welding or by means of extruded tubular extensions formed on the spacers extended through holes in the segments, the projecting ends of which are upset or swedged to clinch the parts together, as by a grommet or eyelet. Welding the metal parts together enables the use of plain unperforated rings of friction facing material, there being no projections to clear upon compacting of the plate in the engagement of the clutch, while the swedging of the tubular extensions requires only shallow depressions on the inner sides of the rings of friction facing material for clearance with respect to the projecting clinching portions. In both cases the elimination of rivets means a saving in cost of manufacture and also a reduction in weight, which in turn means a reduction in flywheel effect. The elimination of holes and depressions in the outer faces of the rings of friction facing material going with the elimination of rivets means more facing area and consequently reduced wear and longer life.

(2) The spacers may be bonded to the rings of friction facing material with the projecting extruded portions on these spacers in register with holes provided in the rings and then the spacers may be secured to the cushion segments in a subsequent assembling operation, wherein all of the extruded portions of the spacers are upset at one time, to save labor cost and insure closer uniformity of the final product in quantity production. The same procedure may, of course, be followed using ordinary rivets instead of extruded portions, in which event the rivet holes provided in the spacers are, of course, located in register with the holes in the rings in a similar type of assembling fixture.

(3) For bonding the rings of friction facing material to the spacers with or without the cushion segments attached I propose to employ what is known as "cycle-weld," namely, a thermoplastic cement, relying upon the application of heat and pressure to bond the parts together, or I may employ a phenolic resin, which again relies upon the application of heat and pressure and takes a longer time than cycle-weld. However, to get around that objection I propose to precure the bond in the assembling of the plate and rely upon the final curing to take place under the heat and pressure to which the plate is subjected in service in the clutch.

The invention is illustrated in the accompanying drawings, in which—

Fig. 1 is a rear view of a clutch plate made in accordance with my invention, the lower portion of the plate being broken away to conserve space, and a portion of one facing ring being broken away to reveal the improved mush construction, in which the spacers are fastened to the cushion plate sections or segments in a novel manner, without separate rivets, and are bonded to the facing rings by a thermoplastic cement under heat and pressure;

Fig. 2 is a section on broken line 2—2 of Fig. 1, showing the mush construction in compacted condition, as when the clutch is engaged;

Fig. 3 is a section on arcuate line 3—3 of Fig. 1, showing the mush construction as it appears before compacting;

Fig. 4 is a view of the inner side of a facing ring of another clutch plate made in a closely similar way in accordance with my invention, showing just the cushion plate sections or segments that have their spacers bonded to this ring, this being a view taken on line 4—4 of Fig. 5;

Fig. 5 is a section of a complete plate taken on line 5—5 of Fig. 4, showing the mush construction in compacted condition;

Fig. 6 is a face view of one of the spring steel cushion segments shown in Figs. 1–5 before its spacer is applied, a face view of the spacer before its application being shown in Fig. 7;

Fig. 8 is a sectional detail on line 8—8 of Fig. 7, and

Figs. 9 and 10 are sections like Fig. 5 but showing further modified or alternative constructions.

Similar reference numerals are applied to corresponding parts throughout the views.

Referring first to Figs. 1 to 3, the clutch plate shown comprises relatively rotatable inner and outer portions, the inner portion being formed by a center hub 11 that is splined for driving connection with the driving shaft of an automotive transmission and provided with an annular flange 12. The flange has circumferentially spaced notches 13 in the marginal portion thereof registering with pockets 14 formed in opposed housing plates 15 which have peripheral flanges 16 that are riveted together, as indicated at 17, thereby providing a circular housing enclosing the flange 12 and also a series of spring cushioning assemblies 18 disposed in the notches 13 and pockets 14. The springs of said assemblies are compressed lengthwise in the rotation of the flange 12 relative to the housing 15 in both directions to cushion the drive and absorb vibration, as well known in this art. At one or more points on the flanges 16 a balancing rivet, like that shown at 19, may be applied to the plate after final assembly to compensate for any uneven distribution of weight, holes 20 being provided in the flanges 16 between the holes provided for the rivets 17.

The outer portion of the plate contains the mush construction with which the present invention is particularly concerned. There are two series of stamped, spring-steel cushion sections or segments 21 and 22, the segments of both series being circumferentially spaced and the segments 21 of one series being in staggered relation to the segments 22 of the other series. The segments 21 and 22 are of identical form and are, therefore, interchangeable, each segment, as illustrated in Fig. 6, comprising a generally rectangular main body portion 23 elongated circumferentially of the plate and having a pair of circumferentially spaced legs 24 extending inwardly therefrom for attachment of the segment to the radially outer rim portion 16 of the housing 15 by means of the aforementioned rivets 17, which are entered through registering holes in the overlapping end portions of the legs 24 on neighboring segments 21—22, as clearly indicated in Fig. 1. The segments 21 and 22 are, therefore, mounted in parallel planes, and their edge portions 24 overlap, as clearly shown in Figs. 1 and 3. Segmental shaped, stamped sheet metal shims or spacers 26 are secured to the outer faces of the main body portions 23 of the segments centrally thereof, using for this purpose extruded tubular projections 27 provided on the spacers as integral portions thereof which fit in registering holes 28 provided in the segments and have their protruding end portions upset or swedged, as indicated at 29. There is so little left projecting when the protruding ends of the tubular extensions 27 are upset or swedged over that there is no need for providing more than just shallow depressions 30 in the inner side of the facing ring 31 opposite these swedged portions to accommodate these small projections when the plate is compacted in the engagement of the clutch.

The friction facing rings or pads 31 engage the outer faces of the shims or spacers 26, and, in accordance with my invention, are bonded to said faces, as indicated by the cross-hatched portions 32 in Figs. 2 and 3. In the actual construction, it will be understood, this bond 32 is of no appreciable thickness but the cross-hatching is employed here for illustrative purposes only. The bond 32 may be of any suitable or preferred type, one practical type being that known as "cycle-weld," similar to what has been employed for the bonding of brake linings to brake shoes, namely a thermo-plastic cement requiring the application of heat and pressure to complete the bond. Another thermoplastic cement suitable for the present purpose is phenolic resin, which also requires heat and pressure. That plastic takes a longer time than the one first mentioned, but that objection is easily avoided by precuring only when the plate is assembled, leaving the final curing for when the plate is in service in the clutch, there being sufficient heat and pressure under those operating conditions to take care of the final curing.

It is clear, therefore, that an appreciable saving in manufacturing cost is realized by eliminating conventional rivets otherwise required for fastening the spacers 26 to the segments 21 and 22. The elimination of such rivets also makes the construction lighter and more compact, and the lighter construction results in reduced flywheel effect. The elimination of rivets also makes it practical to omit holes in the friction facing rings 31, and, while shallow depressions are indicated at 30, it may not be necessary in actual practice to provide them if the swedged ends 29 of the extruded tubular projections 27 on the spacers 26 can be flattened sufficiently to make these projections of no consequence. The elimination of holes in the outer engaging faces of the rings 31 means more facing area and consequently reduced wear and longer life.

Referring to Figs. 4 and 5, the facing rings 31' in this case have holes 33 in register with one another and with the extruded portions 27 of the spacers 26. This makes it possible to bond the spacers 26 separately to the inner sides of the rings 31', using a suitable assembling fixture that will insure accurate registration of the extruded portions 27 with the holes 33 in concentric relation to said holes, so there will be closer uniformity in quantity production of clutch plates, the spacers 26 being thereafter secured as a group to the associated segments 21 and 22, where again an assembling fixture can be used that will insure closer accuracy in the location of the segments with respect to the spacers and facing ring to insure closer uniformity in quantity production of clutch plates. It is clear that an appreciable saving in manufacturing cost is realized by this method. The slight projections formed by the swedged over or upset ends 29 of the extruded portions 27 of the spacers are received in the holes 33 on the other facing ring opposite these projections, so that there is nothing to interfere with the compacting of the mush construction in the engagement of the clutch, but here again I may provide depressions like that shown in 30 in Figs. 1 to 3 on the inner sides of the facing rings to provide clearance, or I may, if the swedging over of the extruded portions 27 leaves only small projections of no consequence, omit even the depressions, providing only the holes 33 required in the upsetting or swedging of the extruded portions 27.

Referring to Fig. 9, the same kind of facing rings 31' are shown, as in Figs. 4 and 5, having holes 33 therein in concentric relation to rivet holes 34 in spacers 26', the spacers in this construction being adapted to be bonded to the facing rings similarly as in the construction of Figs. 4 and 5, as indicated at 32 in Fig. 9. In lieu of the extruded portions 27 being provided as the means for securing the spacers to the segments 21—22, rivets 35 of the conventional type are provided and these may be of brass or steel. The same advantages are derived with this construction as with that of Figs. 4 and 5 insofar as closer uniformity in quantity production is concerned, and saving in cost of production by reason of the handling of the spacers all at one time in the bonding thereof to a facing ring and the handling of the segments all at one time in the riveting thereof to the spacers. Here again, the holes 33 intermediate the ones that are required in the riveting operation provide clearance for the heads of the rivets.

In Fig. 10, facing rings 31'' are shown which have neither holes nor depressions provided therein, neither being needed because of the absence of rivets or any other fastening means involving any projections, the spacers 26'' in this construction being spot-welded, as at 36, to the segments, one of which is indicated at 22'. The spacers 26'' have their outer faces bonded, as indicated at 32, to the inner sides of the facing rings. With this construction, the welding is taken care of first, and then the completed assemblies are thereafter bonded to the facing rings, although the method of Figs. 4 and 9 would be applicable also, because the spot-welds could be made through holes 33 in the facing rings. In the latter event the holes needed for the welding operation would, of course, be the only ones provided, because there would be no problem of providing operating clearance for projections.

It is believed the foregoing description conveys a good understanding of the objects and advantages of my invention. The appended claims have been drawn to cover all legitimate modifications and adaptations.

I claim:

1. In a friction clutch plate, a hub member, two parallel series of flexible resilient sheet metal cushion plate sections concentrically arranged relative to and mounted on said hub member to turn therewith, the cushion plate sections of both series being circumferentially spaced, the cushion plate sections of the two series being arranged to be flexed toward one another to a more compact relationship, rings of friction facing material adapted to be mounted on the outer sides of the two series of cushion plate sections, having sheet metal spacer plates bonded by cement on their outer face to the inner faces of said rings and having their inner face abutting the outer sides of the cushion plate sections to space said rings therefrom, and means securing said spacer plates to said cushion plate sections independently of said rings.

2. A friction clutch plate as set forth in claim 1 wherein the last mentioned means comprises tubular projections integral with each of said spacer plates and projecting inwardly away from the bonded outer surface of said plate and the associated ring of friction facing material and protruding through openings provided in the associated cushion plate section, each of the protruding portions being upset against the inner surface of said cushion plate section which lies normally in spaced relation to the confronting inner surface of the other ring of friction facing material.

3. A friction clutch plate as set forth in claim 1 wherein the last mentioned means comprises tubular projections integral with each of said spacer plates and projecting inwardly away from the bonded outer surface of said plate and the associated ring of friction facing material and protruding through openings provided in the associated cushion plate section, each of the protruding portions being upset against the inner surface of said cushion plate section which lies normally in spaced relation to the confronting inner surface of the other ring of friction facing material, the latter ring having depressions provided therein on the inner face in register with and adapted to furnish operating clearance for said tubular projections in the compacting of the plate in engagement of the clutch.

4. A friction clutch plate as set forth in claim 1 wherein the last mentioned means comprises tubular projections integral with each of said spacer plates and projecting inwardly away from the bonded outer surface of said plate and the associated ring of friction facing material and protruding through openings provided in the associated cushion plate section, each of the protruding portions being upset against the inner surface of said cushion plate section which lies normally in spaced relation to the confronting inner surface of the other ring of friction facing material, the latter ring having openings provided therein in register with and adapted to furnish operating clearance for said tubular projections in the compacting of the plate in engagement of the clutch.

5. A friction clutch plate as set forth in claim 1 wherein the last mentioned means comprises tubular projections integral with each of said spaced plates and projecting inwardly away from the bonded outer surface of said plate and the associated ring of friction facing material and protruding through openings provided in the associated cushion plate section, each of the protruding portions being upset against the inner surface of said cushion plate section which lies normally in spaced relation to the confronting inner surface of the other ring of friction facing material, the two rings of friction facing material having openings provided therein in register with said tubular projections, the openings in the ring bonded to the spacer plates being large enough in diameter in relation to the tubular projections to permit utilization of said openings for entry of tools in abutment with the spacers in connection with the upsetting of the protruding portions of said projections onto the associated cushion plate sections, the openings in the other ring furnishing operating clearance for the upset protruding portions of the said projections.

6. A friction clutch plate as set forth in claim 1 wherein the last mentioned means comprises rivets each having heads on the opposite ends thereof forming projections on the outer face of the spacer plates and on the inner face of the cushion plate sections, the two rings of friction facing material having openings provided therein in register with said rivets, the openings in the ring bonded to the spacer plates being large enough in diameter in relation to the rivets to permit utilization of said openings for entry of tools in abutment with the spacers in connection with the upsetting of the protruding portions of said rivets onto the associated cushion plate sections, the openings in the other ring furnishing operating clearance for the upset protruding portions of the said rivets.

7. In a friction clutch plate, a hub member, two parallel series of flexible resilient sheet metal cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, and rings of friction facing material adapted to be mounted on the outer sides of the two series of cushion plate sections, having sheet metal spacer plates bonded by cement on their outer face to the inner faces of said rings and having their inner face abutting the outer sides of the cushion plate sections to space said rings therefrom leaving more than the overlapping portions of said sections uncovered and free to be flexed for the cushion action, said spacer plates being bonded to said cushion plate sections in surface to surface relationship, whereby the outer face of said spacer plates and the inner face of said cushion plate sections are devoid of projections, and said rings of friction facing material being devoid of openings and/or depressions and the outer clutch engaging surfaces of said rings being imperforate.

8. In a friction clutch plate, a hub member, two parallel series of flexible resilient sheet metal cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, rings of friction facing material adapted to be mounted on the outer sides of the two series of cushion plate sections, having sheet metal spacer plates bonded by cement on their outer face to the inner faces of said rings and having their inner face abutting the outer sides of the cushion plate sections to space said rings therefrom leaving more than the overlapping edge portions of said sections uncovered and free to be flexed for the cushion action, and means securing said spacer plates to said cushion plate sections independently of said rings, the cement between the spacer plates and the rings of friction facing material consisting of thermoplastic material and the bond being completed under heat and pressure.

9. In a friction clutch plate, a hub member, two parallel series of flexible resilient sheet metal cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, rings of friction facing material adapted to be mounted on the outer sides of the two series of cushion plate sections, having sheet metal spacer plates bonded by cement on their outer face to the inner faces of said rings and having their inner face abutting the outer sides of the cushion plate sections to space said rings therefrom leaving more than the overlapping edge portions of said sections uncovered and free to be flexed for the cushion action, and means securing said spacer plates to said cushion plate sections independently of said rings, the cement between the spacer plates and the rings of friction facing material consisting of thermoplastic material and the bond being completed under heat and pressure, said cement being of a resin type which in the application of heat and pressure is only precured, the final curing depending upon the heat and pressure to which the plate is subjected when the plate is in service in the clutch.

10. In a friction clutch plate, a hub member, two parallel series of flexible resilient sheet metal cushion plate sections concentrically arranged relative to and mounted on said hub member to turn therewith, the cushion plate sections of both series being circumferentially spaced and the cushion plate sections of one series being arranged in staggered relation to the cushion plate sections of the other series, the cushion plate sections of the two series being arranged to be flexed toward one another to a more compact relationship and having adjoining lateral edge portions disposed in overlapping relation so as to be flexed to resist compacting of the two series of cushion plate sections, rings of friction facing material adapted to be mounted on the outer sides of the two series of cushion plate sections, having sheet metal spacer plates bonded by cement on their outer face to the inner faces of said rings and having their inner face abutting the outer sides of the cushion plate sections to space said rings therefrom leaving more than the overlapping edge portions of said sections uncovered and free to be flexed for the cushion action, and means securing said spacer plates to said cushion plate sections independently of said rings.

11. In a friction clutch plate, a hub member, two parallel series of flexible resilient sheet metal cushion plate sections concentrically arranged relative to and mounted on said hub member to turn therewith, the cushion plate sections of both series being circumferentially spaced, the cushion plate sections of the two series being arranged to be flexed toward one another to a more compact relationship, and rings of friction facing material adapted to be mounted on the outer sides of the two series of cushion plate sections, having sheet metal spacer plates bonded by cement on their outer face to the inner faces of said rings and having their inner face abutting the outer sides of the cushion plate sections to space said rings therefrom, said spacer plates being bonded to said cushion plate sections in surface to surface relationship, whereby the outer face of said spacer plates and the inner face of said cushion plate sections are devoid of projections, and said rings of friction facing material being devoid of openings and/or depressions and the outer clutch engaging surfaces of said rings bing imperforate.

12. In a friction clutch plate, a hub member, two parallel series of flexible resilient sheet metal cushion plate sections concentrically arranged relative to and mounted on said hub member to turn therewith, the cushion plate sections of both series being circumferentially spaced, the cushion plate sections of the two series being arranged to be flexed toward one another to a more compact relationship, rings of friction facing material adapted to be mounted on the outer sides of the two series of cushion plate sections, having sheet metal spacer plates bonded by cement on their outer face to the inner faces of said rings and having their inner face abutting the outer sides of the cushion plate sections to space said rings therefrom, and means securing said spacer plates to said cushion plate sections independently of said rings, the cement between the spacer plates and the rings of friction facing material consisting of thermoplastic material and the bond being completed under heat and pressure.

13. In a friction clutch plate, a hub member, two parallel series of flexible resilient sheet metal cushion plate sections concentrically arranged relative to and mounted on said hub member to turn therewith, the cushion plate sections of both series being circumferentially spaced, the cushion plate sections of the two series being arranged to be flexed toward one another to a more compact relationship, rings of friction facing material adapted to be mounted on the outer sides of the two series of cushion plate sections, having sheet metal spacer plates bonded by cement on their outer face to the inner faces of said rings and having their inner face abutting the outer sides of the cushion plate sections to space said rings therefrom, and means securing said spacer plates to said cushion plate sections independently of said rings, the cement between the spacer plates and the rings of friction facing material consisting of thermoplastic material and the bond being completed under heat and pressure, said cement being of a resin type which in the application of heat and pressure is only precured, the final curing depending upon the heat and pressure to which the plate is subjected when the plate is in service in the clutch.

References Cited in the file of this patent

UNITED STATES PATENTS

| | | |
|---|---|---|
| 2,379,544 | Scutt | July 3, 1945 |
| 2,524,146 | Thelander | Oct. 3, 1950 |
| 2,559,747 | Batchelor et al. | July 10, 1951 |
| 2,630,199 | Gamble | Mar. 3, 1953 |
| 2,646,151 | Wellman et al. | July 21, 1953 |
| 2,658,598 | Thelander | Nov. 10, 1953 |